April 28, 1936.  E. W. CARROLL  2,038,826
BAIL EAR
Filed April 4, 1932
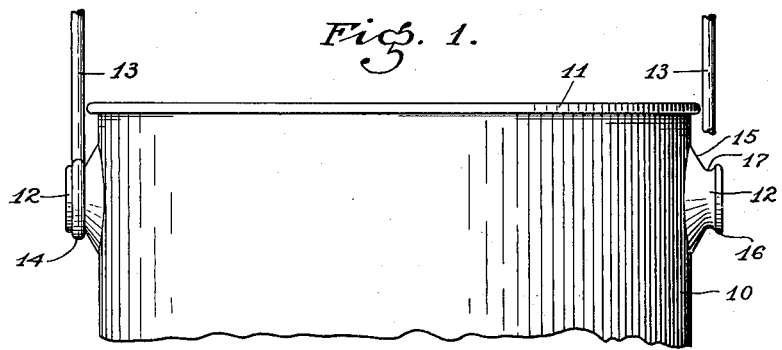
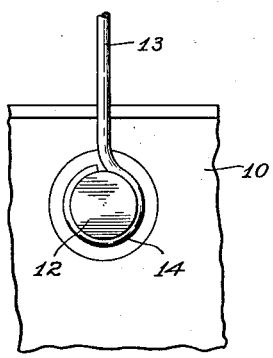 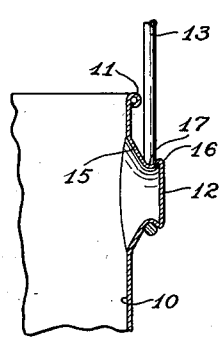 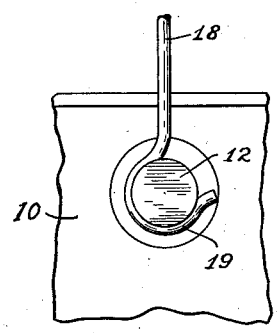
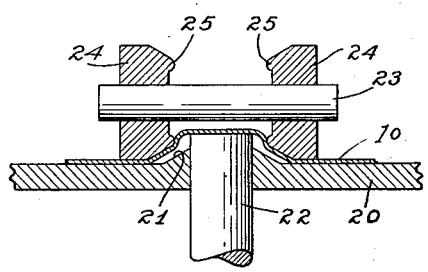 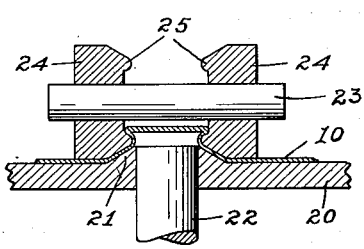
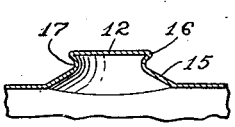
INVENTOR.
ELLSWORTH W. CARROLL
BY
ATTORNEY Patented Apr. 28, 1936

2,038,826

UNITED STATES PATENT OFFICE 2,038,826

BAIL EAR

Ellsworth W. Carroll, San Francisco, Calif., assignor to E. W. Carroll, Inc., San Francisco, Calif., a corporation of California Application April 4, 1932, Serial No. 602,915

5 Claims. (Cl. 220—91)

My present invention relates to receptacles such as pails and the like that have a bail attached thereto and more particularly to improved bail supporting ears for same.

One object of my invention is to provide a new, improved and novel type of bail ear for pails and like receptacles that can be formed in a simple and inexpensive manner.

Another object of my invention is to provide a novel type of bail supporting ear for pails and the like which can be formed integrally upon the wall of the pail or other receptacle by extending the wall of the latter outwardly.

A further object of my invention is to provide a new and novel method of forming my improved bail ears upon pails and like receptacles.

Other objects and advantages of my invention will be in part pointed out and in part evident to those skilled in the art from the following description taken in connection with the accompanying drawing.

In the art to which my invention pertains it has been the practice in affixing handles or bails on receptacles to form the bail ears from separate pieces of metal and then solder the ears upon the receptacle after the latter is formed.

In carrying out my invention I dispense with the necessity for providing separate bail ear elements by extending the wall of the pail or receptacle outwardly so as to form protuberances to which the bail may be attached.

In its preferred form my improved bail ear has a substantially truncated conical base portion and an enlarged annular bead or button at the end for holding the eye of a bail thereon when the eye is formed there around.

For a better understanding of my invention reference should be had to the accompanying drawing wherein I have shown by way of illustration and not of limitation a preferred embodiment thereof.

In the drawing wherein like numerals refer to like parts throughout the several views;

Figure 1 is a fragmentary view in elevation showing the upper part of a pail provided with my improved bail ears, Figure 2 is a fragmentary view showing a front elevation of my improved ear, Figure 3 is a fragmentary sectional view showing the bail ear illustrated in Figures 1 and 2, Figure 4 shows my improved bail ear having a modified form of bail attached thereto, Figure 5 is a diagrammatic view showing portions of a tool in one position for forming my improved bail ear, Figure 6 shows the tool illustrated in Figure 5 in its final forming position, and Figure 7 is a view showing the ear formed by the operations illustrated in Figures 5 and 6.

In the accompanying drawing the numeral 10 designates a pail of the type such as is used in great quantities to transport liquid and semi-liquid substances. Pails of this character are usually provided with a bead 11 at the open end or carry a cover which projects outwardly beyond the outer surface of the pail. The pail 10 is shown as having a pair of bail ears 12 located in oppositely disposed positions upon the pail which are adapted to support a bail 13 in spaced relation with the pail. The bail 13 is usually formed from a piece of heavy wire bent in semi-circular shape and has a bail ear engaging eye 14 at each end.

As illustrated in Figure 2, the bail engaging eyes 14 on the bail 13 are formed so that the bail will be disposed centrally with relation to the pail.

By referring to Figure 3, it will be seen that the bail ear 12 is formed integrally upon the pail 10 by extending the wall of the pail outwardly so as to provide a protuberance about which the bail eye 14 may be disposed. As illustrated in this figure of the drawing, it will be also noted that each of the bail ears is formed by spinning or otherwise drawing the wall of the pail 10 outwardly so as to form a substantially truncated conical portion 15 having a button or enlarged head portion 16, which portions at their point of juncture form a seat or recess 17 for the bail eye 14 when the latter is disposed therearound. The location of the recess 17 at the outer end of the conical portion 15 of the ear serves to hold the end of the bail 13 in spaced relation with the wall of the pail 10 and out of contact with the beading 11.

In Figure 4 of the drawing I have shown my improved bail ear as having a readily detachable bail 18 attached thereto. In this instance the bail 18, instead of having closed eyes 14, is provided with open hooks 19 which can be easily slipped over and removed from the bail ears.

Where the pail or other receptacle to which my improved ear is to be applied is formed of a highly ductile material such as soft iron or copper the ears 12 may be readily formed thereupon by simply drawing the wall of the pail outwardly in a suitable press, but where the pail or other receptacle is formed of a less ductile metal the problem of forming the ears is not such a simple matter. In this latter case it has been found that the wall of the receptacle can not be extended without damaging the pail, unless special precautions are taken.

One method that can be successfully carried out in forming ears of the character described above on relatively non-ductile metals contemplates a spinning of the metal into its final form. In applying this method it is to be understood that various types of spinning tools and fixtures may be used in the spinning operation, but for the purpose of this description I have schematically illustrated in Figures 5 and 6 the cooperating parts of a special spinning fixture which has been developed by me for forming the bail ears.

The spinning fixture, the essential parts of which are illustrated in the drawing, is fully described and claimed in my Patent No. 1,994,034, issued March 12, 1935, and entitled "Machine and method for forming protuberances on sheet metal." For a better understanding of the mode of operation and a fuller description of this machine, reference should be had to the above patent.

As illustrated in Figure 5, the spinning fixture in its preferred form comprises a substantially flat support 20 having a truncated conical boss 21. Extending through the conical boss 21 there projects an adjustable anvil 22 over which the pail forming blank may be placed. Mounted in axial alignment with the anvil 22, I provide a suitable spindle (not shown) that in one form has a transversely extending shaft 23 upon which oppositely disposed spinning rollers 24 are mounted. These rollers 24 are tapered off on their adjacent faces and have an annular surface 25 of a configuration corresponding substantially to the shape and dimensions of the bail ear desired. These rollers 24 are so mounted upon the shaft 23 that they may be progressively moved toward each other after the metal which is to form the pail 10 has been drawn down over the anvil 22 to the position illustrated in Figure 5. As soon as the blank has been formed, as described above and illustrated in Figure 5, the anvil 22 is then withdrawn until its end is substantially flush with the top of the annular truncated conical boss 21. After the anvil has been withdrawn to the position illustrated in Figure 6 the spinning operation is continued and the rollers 24 are forced toward each other so as to reduce the diameter of the protuberance formed by the first steps of the method.

During this latter operation the conical portion 15 of the protuberance will be reduced in diameter at a point intermediate its base and end and will result in the formation of the enlarged head or beading 16 at the outer end thereof, as illustrated in Figure 7. The beading 16 thus formed will, in cooperation with the truncated conical base portion 15 of the ear 12, locate the recess or seat 17 some distance from the pail. As a result the recess 17 will hold the bail eye 14 and the bail 13 in spaced relation with the pail where the bail can be easily raised to its useful position or lowered when not in use without intereference with the beading 11 or a cover should one be provided.

While I have, for the sake of clearness and in order to disclose my invention so that the same can be readily understood, described and illustrated a particular embodiment and method of procedure, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. The combination of a sheet metal pail having its wall upset at two points to form radially extending integral imperforate bail supporting protuberances, and a bail having end portions extending about said protuberances.

2. A bail supporting means for a metallic pail, comprising oppositely disposed protuberances formed by an outward extension of the wall of the pail, said protuberances having a reduced diameter at a point removed from the wall of the pail and an enlarged end portion, whereby a bail eye bent therearound will be held in spaced relation with the wall of the pail.

3. A bail supporting ear for a pail having a swinging bail, comprising a protuberance formed by an outward extension of the wall of the pail, said protuberance having a shoulder forming base portion and an enlarged end portion, whereby a bail eye bent around said protuberance will be held in spaced relation with the wall of the pail.

4. A bail supporting means for a metallic pail, comprising a pair of oppositely disposed protuberances on the wall of the pail, said protuberances being formed integral with and by extending the wall of the pail outwardly and having a shoulder portion adjacent the wall of the pail and an enlarged head at the end thereof, whereby a bail end when bent therearound will be held between said shoulder portion and said enlarged head in spaced relation with the wall of the pail.

5. The combination of a pail formed of sheet metal having an enlarged rim at the open end thereof, oppositely disposed protuberances formed by an outward radial extension of the metal forming the wall of the pail, said protuberances having a reduced diameter at a point removed from the wall of the pail and an enlarged imperforate button like head at the ends thereof, and a bail extending between said protuberances having eyelets disposed tangentially to the wall of the pail and about the reduced diameter of said protuberances, whereby the bail may swing freely upon said protuberances without interfering with the enlarged rim about the open end of the pail.

ELLSWORTH W. CARROLL.